United States Patent [19]
An

[11] Patent Number: 5,544,200
[45] Date of Patent: Aug. 6, 1996

[54] ACQUISITION OF CARRIER PHASE AND SYMBOL TIMING THROUGH JOINT ESTIMATION OF PHASE AND TIMING ADJUSTMENTS

[75] Inventor: Song H. An, San Diego, Calif.

[73] Assignee: Titan Information Systems Corporation, San Diego, Calif.

[21] Appl. No.: 351,797

[22] Filed: Dec. 8, 1994

[51] Int. Cl.$^6$ ................................................ H04L 27/06
[52] U.S. Cl. ........................... 375/344; 375/354; 375/261
[58] Field of Search ................................. 375/261, 344, 375/354; 455/255, 256, 257

[56] References Cited

U.S. PATENT DOCUMENTS

| | | | |
|---|---|---|---|
| 3,962,637 | 6/1976 | Motley et al. | 375/232 |
| 4,759,036 | 7/1988 | Meyers | 375/344 |
| 5,151,926 | 9/1992 | Chennakeshu et al. | 375/333 |
| 5,197,125 | 3/1993 | Engel et al. | 395/200 |
| 5,282,227 | 1/1994 | Crawford | 375/81 |
| 5,283,815 | 2/1994 | Chennakeshu et al. | 375/330 |

OTHER PUBLICATIONS

C. Heegard, J. A. Heller and A. J. Viterbi, "A Microprocessor-Based PSK Modem for Packet Transmission Over Satellite Channels", IEEE Transactions on Communications, vol. COMM-26, No. 5, pp. 552-564, May, 1978.

L. E. Franks, "Carrier and Bit Synchronization in Data Communication—A Tutorial Review", IEEE Transactions on Communications, vol. COMM-28, No. 8, pp. 1107-1120, Aug., 1980.

A. J. Viterbi and A. M. Viterbi, "Nonlinear Estimation of PSK-Modulated Carrier Phase with Application to Burst Digital Transmission", IEEE Transactions on Information Theory, vol. IT-29, No. 4, pp. 543-551, Jul., 1983.

Sippl, Charles, "Dictionary of Data Communications", 1985 pp. 357-358.

*Primary Examiner*—Stephen Chin
*Assistant Examiner*—Huong Luu
*Attorney, Agent, or Firm*—Edward W. Callan

[57] ABSTRACT

A signal acquisition system rapidly acquires carrier phase and symbol timing of a received PSK-modulated communication signal having a 110-symbol pattern through joint estimation of carrier-phase adjustment and symbol-timing adjustment by processing a common set of sampled data. A reference signal at a local oscillator frequency is mixed with a received communication signal to provide the communication signal at an intermediate frequency. The intermediate-frequency communication signal is converted into a digital communication signal, which is formatted into in-phase (I) and quadrature-phase (Q) components. A sampling circuit samples the I components at twice a predetermined symbol rate to provide a first series of I-component samples at the predetermined symbol rate and a second series of I-component samples that are intermediate to the first series of I-component samples and at the predetermined symbol rate, and for sampling the Q components at twice the predetermined symbol rate to provide a first series of Q-component samples at the predetermined symbol rate and a second series of Q-component samples that are intermediate to the first series of Q-component samples and at the predetermined symbol rate. A processor processes the samples to estimate a phase-adjustment value and a symbol-timing-adjustment value. The phase of the reference signal is adjusted in accordance with the phase-adjustment value and the timing of the sampling is adjusted in accordance with the symbol-timing-adjustment value.

7 Claims, 1 Drawing Sheet

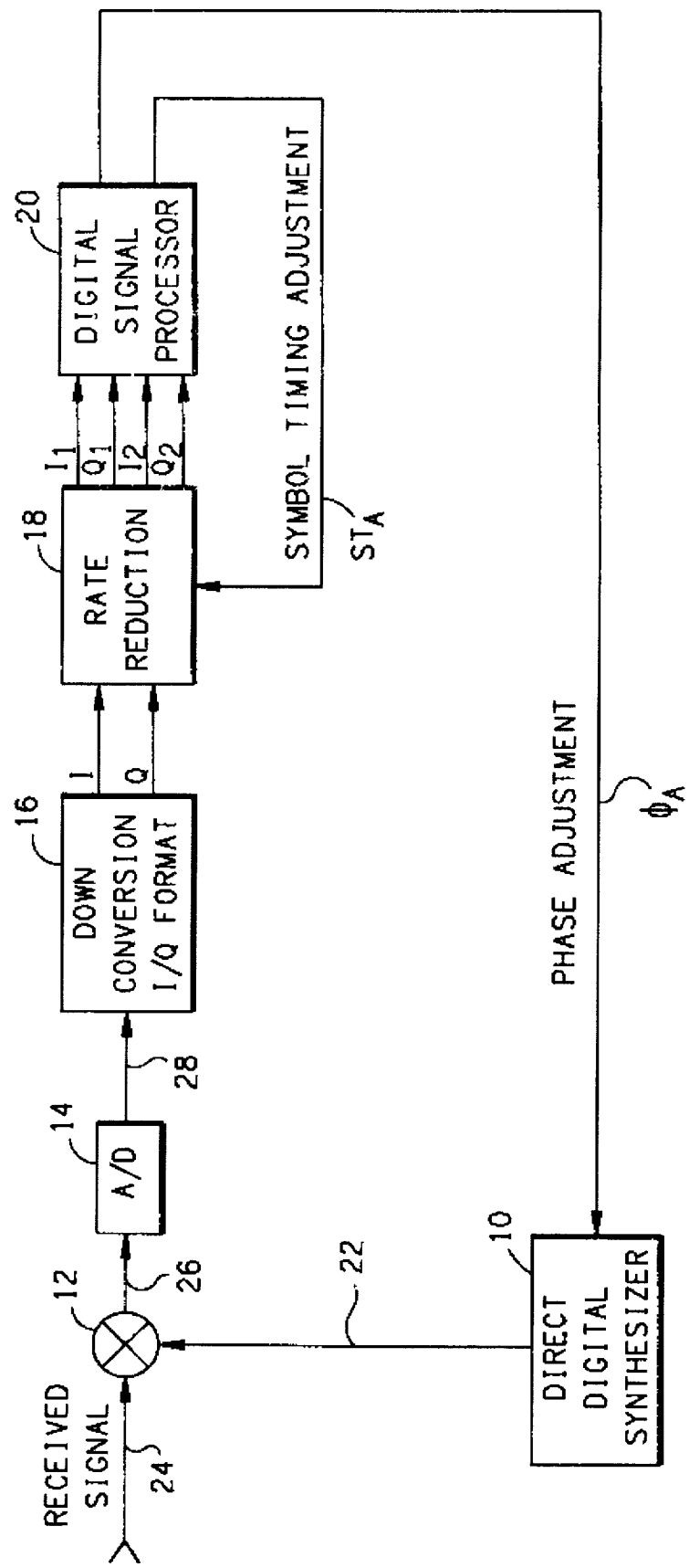

ACQUISITION OF CARRIER PHASE AND SYMBOL TIMING THROUGH JOINT ESTIMATION OF PHASE AND TIMING ADJUSTMENTS

BACKGROUND OF THE INVENTION

The present invention generally pertains to communication signal acquisition and is particularly directed to a system for acquiring carrier phase and symbol timing of a received communication signal.

Various techniques for acquiring carrier phase and/or symbol timing of received communications signals are described by C. Heegard, J. A. Heller and A. J. Viterbi, "A Microprocessor-Based PSK Modem for Packet Transmission Over Satellite Channels", IEEE Transactions on Communications, Vol. COMM-26, No. 5, pp. 552–564, May, 1978; L. E. Franks, "Carrier and Bit Synchronization in Data Communication—A Tutorial Review", IEEE Transactions on Communications, Vol. COMM-28, No. 8, pp. 1107–1120, August, 1980; A. J. Viterbi and A. M. Viterbi, "Nonlinear Estimation of PSK-Modulated Carrier Phase with Application to Burst Digital Transmission", IEEE Transactions on Information Theory, Vol. IT-29, No. 4, pp. 543–551, July, 1983; and U.S. Pat. No. 5,282,227 to James A. Crawford for "Communication Signal Detection and Acquisition".

SUMMARY OF THE INVENTION

The present invention provides a system for rapidly acquiring carrier phase and symbol timing of a received communication signal through joint estimation of carrier-phase adjustment and symbol-timing adjustment by processing a common set of sampled data.

The system of the present invention comprises a local oscillator for providing a reference signal at a local oscillator frequency; a mixer for mixing a received communication signal with the reference signal to provide the communication signal at an intermediate frequency; an analog-to-digital converter for converting the intermediate-frequency communication signal to a digital communication signal; a circuit for formatting the digital communication signal into in-phase (I) and quadrature-phase (Q) components; a sampling circuit for sampling the I components at twice a predetermined symbol rate to provide a first series of I-component samples at the predetermined symbol rate and a second series of I-component samples that are intermediate to the first series of I-component samples and at the predetermined symbol rate, and for sampling the Q components at twice the predetermined symbol rate to provide a first series of Q-component samples at the predetermined symbol rate and a second series of Q-component samples that are intermediate to the first series of Q-component samples and at the predetermined symbol rate; and a processor for processing the samples to estimate a phase-adjustment value and a symbol-timing-adjustment value; wherein the processor is coupled to the local oscillator for adjusting the phase of the reference signal in accordance with the phase-adjustment value and to the sampling circuit for adjusting the timing of said sampling in accordance with the symbol-timing-adjustment value.

The system of the present invention is particularly useful in rapidly acquiring carrier phase and symbol timing of a received communication signal that is characterized by message-bursts, such as utilized in the multiple-user DAMA communication system described in U.S. Pat. No. 5,197,125 to Gernot M. Engel, Dwight R. Bean and Edward F. Smith.

Additional features of the present invention are described with reference to the detailed description of the preferred embodiments.

BRIEF DESCRIPTION OF THE DRAWING

The sole FIGURE is a block diagram of a preferred embodiment of the system of the present invention.

DETAILED DESCRIPTION

The Drawing illustrates a preferred embodiment of the system of the present invention that is designed for rapidly acquiring carrier phase and symbol timing of a received PSK-modulated communication signal having a 110-symbol pattern. The system includes a local oscillator embodied in a direct digital synthesizer (DDS) 10, a mixer 12, an analog-to-digital (A/D) converter 14, a down-converter circuit 16, a rate reduction circuit 18 and a digital signal processor 20.

The local oscillator 10 provides a reference signal 22 at a local oscillator frequency. The mixer 12 mixes a received communication signal 24 with the reference signal 22 to provide the communication signal 26 at an intermediate frequency. The analog-to-digital converter 14 converts the intermediate-frequency communication signal 26 to a digital communication signal 28. The down-converter circuit formats the digital communication signal 28 into in-phase components I and quadrature-phase components Q.

The rate reduction circuit 18 samples the I components at twice a predetermined symbol rate to provide a first series of I-component samples I1 at the predetermined symbol rate and a second series of I-component samples I2 that are half-way intermediate to the first series of I-component samples and at the predetermined symbol rate. The rate reduction circuit 18 also samples the Q components at twice the predetermined symbol rate to provide a first series of Q-component samples Q1 at the predetermined symbol rate and a second series of Q-component samples Q2 that are half-way intermediate to the first series of Q-component samples and at the predetermined symbol rate.

The processor 20 processes the samples I1, Q1, I2, Q2 to estimate a phase-adjustment value $\phi_A$ and a symbol-timing-adjustment value $ST_A$. The processor 20 is coupled to the local oscillator 10 for adjusting the phase of the reference signal 22 in accordance with the phase-adjustment value $\phi_A$ and to the rate reduction circuit 18 for adjusting the timing of the sampling a number of samples indicated by the symbol-timing-adjustment value $ST_A$.

The processor 20 is adapted for estimating an amplitude component "y" of the symbol-timing-adjustment value $ST_A$ by computing:

$$y = (BB2 - BB1)/(BB2 + BB1), \qquad \text{(Eq. 1)}$$

wherein $$BB1 = \sum_{k=1}^{3} \|B1(k)\|^2, \qquad \text{(Eq. 2)}$$

$$BB2 = \sum_{k=1}^{3} \|B2(k)\|^2, \qquad \text{(Eq. 3)}$$

$$B1(1) = W1_1 + W1_4 + W1_7 + W1_{10} + \ldots, \qquad \text{(Eq. 4)}$$

$$B1(2)=W1_2+W1_5+W1_8+W1_{11}+\ldots, \quad \text{(Eq. 5)}$$

$$B1(3)=W1_3+W1_6+W1_9+W1_{12}+\ldots, \quad \text{(Eq. 6)}$$

$$B2(1)=W2_1+W2_4+W2_7+W2_{10}+\ldots, \quad \text{(Eq. 7)}$$

$$B2(2)=W2_2+W2_5+W2_8+W2_{11}+\ldots, \quad \text{(Eq. 8)}$$

$$B2(3)=W2_3+W2_6+W2_9+W2_{12}+\ldots, \quad \text{(Eq. 9)}$$

$W1_n$ is a complex sample consisting of a first-series I-component sample and a coincident first-series Q-component sample; and $W2_n$ is a complex sample consisting of a second-series I-component sample and a coincident second-series Q-component sample, for n=1, 2,3, . . .

The processor 20 is adapted for estimating the sign of the symbol-timing-adjustment value $ST_A$ by computing:

$$CC1 = \sum_{k=1}^{3} \|C1(k)\|^2, \quad \text{(Eq. 10)}$$

and $$CC2 = \sum_{k=1}^{3} \|C2(k)\|^2, \quad \text{(Eq. 11)}$$

wherein, the sign is positive when CC1<CC2, and the sign is negative when CC1≧CC2, $$C1(k)=B1(k)+B2(k) \text{ for } k=1, 2, 3, \quad \text{(Eq. 13)}$$

$$C2(1)=B1(1)+B2(3), \quad \text{(Eq. 14)}$$

$$C2(2)=B1(2)+B2(1), \quad \text{(Eq. 15)}$$

and $$C2(3)=B1(3)+B2(2). \quad \text{(Eq. 16)}$$

In a preferred embodiment, in which there are 40 complex samples per symbol, the symbol-timing adjustment $ST_A$ is estimated in accordance with the following equations:

$$ST_A=[(6y/0.3077)+10]/40, \text{ for } |y| \leq 0.3077 \quad \text{(Eq. 17)}$$

$$ST_A=4\{[\min(y, 0.5)-0.3077]/[0.5-0.3077]\}/40+16/40, \text{ for } y>0.3077 \quad \text{(Eq. 18)}$$

and $$ST_A=4\{[\max(y, -0.5)+0.5]/[0.5-0.3077]\}/40, \text{ for } y<-0.3077 \quad \text{(Eq. 19)}$$

The value 0.3077 defines a transition between a linear mid range and non-linear outer ranges. The symbol timing adjustment $ST_A$ simulates an S-curve adjustment characteristic that is commonly used in phase-locked loops.

The processor 20 is adapted for estimating a phase-adjustment value $\phi_A$ by computing:

$$\phi_A=(\phi_1+\phi_2+\phi_3)/6, \quad \text{(Eq. 20)}$$

wherein if BB1≧BB2, $\phi_k$ is the phase angle $\Phi_B$ of B1 (k) after removing the modulation for k=1, 2, 3, and otherwise, $\phi_k$ is the phase angle $\Phi_B$ of B2 (k) after removing the modulation for k=1, 2, 3; and wherein for $$B=a+jb, \quad \Phi_B=\tan^{-1}(a/b). \quad \text{(Eq. 21)}$$

In computing the phase-adjustment value $\phi_A$, modulo $2\pi$ should be considered.

While the above description contains many specificities, these should not be construed as limitations on the scope of the present invention, but rather as exemplifications of the preferred embodiments described herein. Other variations are possible and the scope of the present invention should be determined not by the embodiments described herein but rather by the claims and their legal equivalents.

I claim:

1. A system for acquiring carrier phase and symbol timing of a received communication signal, comprising a local oscillator for providing a reference signal at a local oscillator frequency;

a mixer for mixing a received communication signal with a reference signal to provide the communication signal at an intermediate frequency;

an analog-to-digital converter for converting the intermediate-frequency communication signal to a digital communication signal;

a circuit for formatting the digital communication signal into in-phase (I) and quadrature-phase (Q) components;

a sampling circuit for sampling the I components at twice a predetermined symbol rate to provide a first series of I-component samples at the predetermined symbol rate and a second series of I-component samples that are intermediate to the first series of I-component samples and at the predetermined symbol rate, and for sampling the Q components at twice the predetermined symbol rate to provide a first series of Q-component samples at the predetermined symbol rate and a second series of Q-component samples that are intermediate to the first series of Q-component samples and at the predetermined symbol rate; and a processor for processing the samples to estimate a phase-adjustment value and a symbol-timing-adjustment value;

wherein the processor is coupled to the local oscillator for adjusting the phase of the reference signal in accordance with the phase-adjustment value and to the sampling circuit for adjusting the timing of said sampling in accordance with the symbol-timing-adjustment value.

2. A system according to claim 1, wherein the timing of said sampling is adjusted by a number of samples indicated by the symbol-timing-adjustment value.

3. A system according to claim 2, wherein the processor is adapted for estimating an amplitude component "y" of the symbol-timing-adjustment value by computing:

$$y=(BB2-BB1)/(BB2+BB1),$$

wherein $$BB1 = \sum_{k=1}^{3} \|B1(k)\|^2,$$

$$BB2 = \sum_{k=1}^{3} \|B2(k)\|^2,$$

$$B1(1)=W1_1+W1_4+W1_7+W1_{10}+\ldots,$$

$$B1(2)=W1_2+W1_5+W1_8+W1_{11}+\ldots,$$

$$B1(3)=W1_3+W1_6+W1_9+W1_{12}+\ldots,$$

$$B2(1)=W2_1+W2_4+W2_7+W2_{10}+\ldots,$$

$$B2(2)=W2_2+W2_5+W2_8+W2_{11}+\ldots,$$

$$B2(3)=W2_3+W2_6+W2_9+W2_{12}+\ldots,$$

$W1_n$ is a complex sample consisting of a first-series I-component sample and a coincident first-series Q-component sample; and $W2_n$ is a complex sample consisting of a second-series I-component sample and a coincident second-series Q-component sample, for n=1, 2,3, . . .

4. A system according to claim 3, wherein the processor is adapted for estimating a phase-adjustment value "$\phi_A$" by computing:

$$\phi_A = (\phi_1 + \phi_2 + \phi_3)/6,$$

wherein if BB1 ≧ BB2, $\phi_k$ is the phase angle $\Phi_B$ of B1 (k) after removing the modulation for k=1, 2, 3, and otherwise, $\phi_k$ is the phase angle $\Phi_B$ of B2 (k) after removing the modulation for k=1, 2, 3; and
wherein for $$B = a+jb, \ \Phi_B = \tan^{-1}(a/b).$$

5. A system according to claim 3, wherein the processor is adapted for estimating the sign of the symbol-timing-adjustment value by computing:

$$CC1 = \sum_{k=1}^{3} \|C1(k)\|^2,$$

and $$CC2 = \sum_{k=1}^{3} \|C2(k)\|^2,$$

wherein, the sign is positive when CC1<CC2, and the sign is negative when CC1 ≧ CC2, $$C1(k) = B1(k) + B2(k) \text{ for } k=1, 2, 3,$$

$$C2(1) = B1(1) + B2(3),$$

$$C2(2) = B1(2) + B2(1),$$

and $$C2(3) = B1(3) + B2(2).$$

6. A system according to claim 5, wherein the processor is adapted for estimating a phase-adjustment value "$\phi_A$" by computing:

$$\phi_A = (\phi_1 + \phi_2 + \phi_3)/6,$$

wherein if BB1 ≧ BB2, $\phi_k$ is the phase angle $\Phi_B$ of B1 (k) after removing the modulation for k=1, 2, 3, and otherwise, $\phi_k$ is the phase angle $\Phi_B$ of B2 (k) after removing the modulation for k=1, 2, 3; and
wherein for $$B = a+jb, \ \Phi_B = \tan^{-1}(a/b).$$

7. A system according to claim 1, wherein the processor is adapted for estimating a phase-adjustment value "$\phi_A$" by computing:

$$\phi_A = (\phi_1 + \phi_2 + \phi_3)/6,$$

wherein if BB1 ≧ BB2, $\phi_k$ is the phase angle $\Phi_B$ of B1 (k) after removing the modulation for k=1, 2, 3, and otherwise, $\phi_k$ is the phase angle $\Phi_B$ of B2 (k) after removing the modulation for k=1, 2, 3;
wherein for $$B = a+jb, \ \Phi_B = \tan^{-1}(a/b);$$

and
wherein $$BB1 = \sum_{k=1}^{3} \|B1(k)\|^2,$$

$$BB2 = \sum_{k=1}^{3} \|B2(k)\|^2,$$

$$B1(1) = W1_1 + W1_4 + W1_7 + W1_{10} + \ldots,$$

$$B1(2) = W1_2 + W1_5 + W1_8 + W1_{11} + \ldots,$$

$$B1(3) = W1_3 + W1_6 + W1_9 + W1_{12} + \ldots,$$

$$B2(1) = W2_1 + W2_4 + W2_7 + W2_{10} + \ldots,$$

$$B2(2) = W2_2 + W2_5 + W2_8 + W2_{11} + \ldots,$$

$$B2(3) = W2_3 + W2_6 + W2_9 + W2_{12} + \ldots,$$

$W1_n$ is a complex sample consisting of a first-series I-component sample and a coincident first-series Q-component sample; and $W2_n$ is a complex sample consisting of a second-series I-component sample and a coincident second-series Q-component sample, for n=1, 2,3, . . .

* * * * *

UNITED STATES PATENT AND TRADEMARK OFFICE
CERTIFICATE OF CORRECTION

PATENT NO. : 5,544,200
DATED : August 6, 1996
INVENTOR(S) : Song H. An

It is certified that error appears in the above-indentified patent and that said Letters Patent is hereby corrected as shown below:

Column 5, line 21, "$\Phi_B - \tan^{-1} (a/b)$." should read --$\Phi_B = \tan^{-1} (a/b)$.--.

Column 6, line 7, "$\Phi_B = \tan^{-1} (a/b)$." should read --$\Phi_B = \tan^{-1} (a/b)$.--.

Signed and Sealed this

Tenth Day of December, 1996

BRUCE LEHMAN

Attest:

*Attesting Officer*

*Commissioner of Patents and Trademarks*